United States Patent
Glassner

(10) Patent No.: US 6,840,880 B2
(45) Date of Patent: Jan. 11, 2005

(54) POWER DIVIDER FOR MOTOR VEHICLES COMPRISING AN OFF-ROAD SPEED GEAR AND A SET-OFF-OUT-PUT

(75) Inventor: Rudolf Glassner, Kottes (AT)

(73) Assignee: Steyr-Daimler-Puch Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 10/333,452

(22) PCT Filed: Jul. 19, 2001

(86) PCT No.: PCT/AT01/00248

§ 371 (c)(1),
(2), (4) Date: Jul. 24, 2003

(87) PCT Pub. No.: WO02/08007

PCT Pub. Date: Jan. 31, 2002

(65) Prior Publication Data

US 2004/0014546 A1 Jan. 22, 2004

(30) Foreign Application Priority Data

Jul. 19, 2000 (AT) .......................... 530/2000 U

(51) Int. Cl.[7] ............................................. F16H 37/08
(52) U.S. Cl. ...................... 475/198; 475/199; 475/201; 475/204; 475/205; 475/206; 192/48.91; 180/247; 180/248
(58) Field of Search ................................ 475/198, 199, 475/201, 204, 205, 206; 192/48.91, 53.34, 69.9; 180/247, 248

(56) References Cited

U.S. PATENT DOCUMENTS

| | | | | |
|---|---|---|---|---|
| 4,898,259 A | * | 2/1990 | Fujitani et al. | ............. 180/250 |
| 5,836,847 A | * | 11/1998 | Pritchard | ..................... 475/204 |
| 5,902,205 A | * | 5/1999 | Williams | ..................... 475/204 |
| 6,056,666 A | * | 5/2000 | Williams | ..................... 475/320 |

* cited by examiner

Primary Examiner—Saul Rodriguez
Assistant Examiner—David D. Le
(74) Attorney, Agent, or Firm—Bachman & LaPointe, P.C.

(57) ABSTRACT

A power-split transmission for motor vehicles with off-road travel consists of a case (1), of an input shaft (2), of a first output shaft (3) coaxial with the latter, of a second output shaft (4), of a reduction unit (5), of a clutch unit (6) and of an offset drive (7). In order to make the power-split transmission compact, with low loss and low noise and synchronizable, the reduction unit (5) consist of: a central driving gearwheel (11) on a first hollow shaft (12), a central ring gear (13) with a second hollow shaft (14), first and second intermediate gearwheels (15, 16) with axle fixed to the case, in each case the first intermediate gearwheel (15) meshing with the central driving gearwheel (11), the second intermediate gearwheel (16) with central ring gear (13) and the first and second intermediate gearwheels (15, 16) with one another, and a power take-off shaft (17), and the clutch unit (6) consists of: primary parts (21, 24) on the input shaft (2) and on the second hollow shaft (14), secondary parts (22, 23) on the power take-off shaft (17) and on the first hollow shaft (12), a first shift sleeve (25) and a second shift sleeve (26) for changing over between road travel and off road travel.

12 Claims, 4 Drawing Sheets

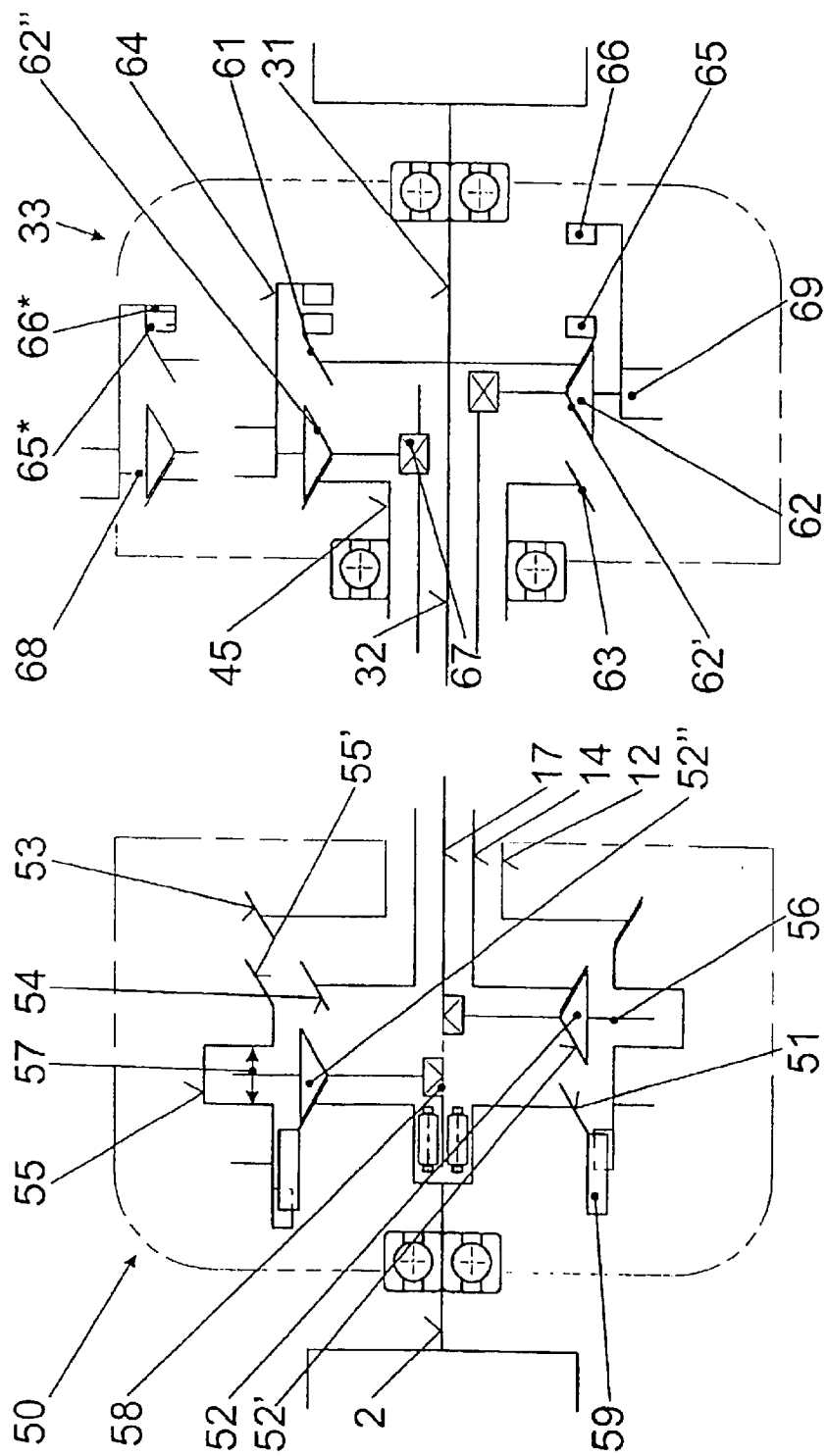

POWER DIVIDER FOR MOTOR VEHICLES COMPRISING AN OFF-ROAD SPEED GEAR AND A SET-OFF-OUT-PUT

BACKGROUND OF THE INVENTION

The invention is concerned with a power-split transmission for motor vehicles with off-road travel, consisting of a case, of an input shaft, of a first output shaft coaxial with the latter, of a second output shaft offset with respect to said first output shaft, of a reduction unit, of a clutch unit and of an offset drive. This form of power-split transmission is also designated as "single-offset". It is used, above all, for all-wheel driven passenger motor vehicles and light commercial vehicles with a longitudinally arranged engine/transmission block, while there can be a changeover from road travel to off-road travel by means of the reduction unit, an interaxle differential is often dispensed with and the drive of the second driven axle can be cut in.

A generic power-split transmission is known from EP 943 479 A1. In this, the reduction unit on the side of the input shaft is a planetary transmission with a ring gear fixed to the case and with power take-off at the planet carrier. Directly behind, the associated shift device is accommodated. This is followed, in one embodiment (FIG. 2), by a central differential and then the driving wheel of the offset drive; in another embodiment (FIG. 9), it is the driving wheel of the offset drive and, finally, a clutch for cutting in the second driven axle.

The reduction unit has various disadvantages. On account of the ring gear fixed to the case, the planetary transmission corotates with meshing even in road travel, thus increasing the losses, wear and generation of noise. Moreover, in the case of single-stage planetary transmissions of this form of construction, the design for achieving the reductions (2:1 to 3:1) customary for off-road travel results in unfavorably small planet wheels. The shift device between the planetary transmission and the driving wheel of the offset drive is not readily accessible, increases the construction length and displaces the offset drive to the rear, the latter factor being unfavorable, inter alia, for reasons of the radiation of solid-born sound through the case.

The object of the invention is, therefore, to eliminate the foregoing disadvantages. The power-split transmission is to be short and compact, with low loss and low noise and also suitable for modularization and the mounting of synchronization.

SUMMARY OF THE INVENTION

The foregoing object is achieved, according to the invention, wherein the reduction unit forms a fixed-shaft transmission, but could also be designated as a planetary transmission with a planet carrier fixed to the case and with a Ravigneaux-type gear set. The two intermediate gearwheels prevent a reversal in direction of rotation between the drive and the power take-off and afford wide freedom of configuration in the implementation of reduction. Reductions of between 2:1 and 3:1 can be implemented optimally. A further advantage of the planet carrier fixed to the case is that the central driving gearwheel and the central ring gear are centered by the intermediate wheels, so that they do not need specific radial bearings. Axial bearings, which are necessary in any case with helical toothing, are sufficient.

Together with the hollow shafts and the clutch unit according to the invention, a particular advantage is also achieved: in road travel, the reduction unit is not only taken out of the force flux, but may even be stationary. The drive-through from the input shaft via the clutch to the power take-off shaft is direct. Road travel is therefore virtually loss-free and noiseless.

By means of the two hollow shafts, the clutch unit can be drawn out of the reduction unit and arranged in front or behind of the latter, thus reducing the overall length of the case and, as will be shown later, assisting the addition of synchronization.

The clutch unit consists of two primary parts and two secondary parts which, in the simplest instance, may be sliding-sleeve clutches which can be connected to one another in various ways by means of the two shift sleeves. The first shift sleeve serves for the rotationally fixed connection of the input shaft to the first hollow shaft in off-road travel, and the second shift sleeve serves for the rotationally fixed connection of the input shaft to the power take-off shaft in road travel and for connecting the second hollow shaft to the power take-off shaft in off-road travel.

The two hollow shafts are preferably led out of the reduction unit forward on the side facing the input shaft. In this case, the second hollow shaft is arranged within the first hollow shaft. The clutch unit can thereby be arranged outside the reduction unit where it is easily accessible and is not restricted in diameter.

In a particularly simple embodiment without a central differential, the power take-off shaft can be connected fixedly in terms of rotation to a driving wheel of the offset drive via a cut-in clutch. The case can therefore be made particularly short, insofar as the same case is not also used for a version with a central differential in a modular form of construction.

In the preferred embodiment with a central differential, the power take-off shaft is drive-connected to a central differential which is designed as a planetary transmission and two axle drive shafts of which can be connected fixedly in terms of rotation selectively to a driving wheel of the offset drive in each case via a cut-in clutch. The central differential designed as a planetary transmission increases the overall length only slightly. The cut-in clutch may be arranged behind the planetary transmission, so that the second output shaft is also relatively far forward. Overall, an extremely compact form of construction is achieved in this way, because the two clutches are drawn out of the transmission forward and rearward.

The preferred design of the central differential according to the present invention provides a Ravigneaux-type gear set which affords the advantages, apart from the short overall length, that the ratio of the torques metered to the first and to the second output shaft can be adapted to the vehicle-specific requirements simply by the choice of the number of teeth of the sun wheel, and that no reversal in direction of rotation takes place. Since this advantage also applies to the reduction stage, what can easily be achieved is that the ring gear and the differential ring gear and/or the intermediate gearwheels and the planet wheels are identical parts. The cost saving achieved by means of this measure is obvious.

In a development of the invention, the cut-in clutch has comprising first, second and third couplings. The coupling parts are, in the simplest instance, hubs with coupling teeth and are arranged behind the central differential. As a result, there is wide freedom in their configuration which also allows the addition of synchronization. Thus, even with a single clutch sleeve, two-wheel drive, four-wheel drive with longitudinal balancing via the central differential and four-wheel drive with differential lock may be selected and may be shifted in the appropriate sequence.

If all the advantages are utilized, the subassemblies of the power-split transmission may be arranged in such a way that the reduction unit and the central differential are directly adjacent, being followed, in the direction of the first output shaft, first by the offset drive and then by the cut-in clutch. The installation dimensions are thus minimized, the case becomes short and rigid and the offset drive can be arranged very far forward.

Also, by all the advantages being utilized, so much construction space is available for the clutch unit and for the cut-in clutch that the clutches can be provided with synchronizations which must meet very high requirements during the pronounced stage jump between road travel and off-road travel or in the case of the high rotational speed difference when one of the axles loses wheel adhesion. These requirements can be satisfied by large diameters of the synchronized clutch parts.

In a particularly refined design of the clutch unit, the second shift sleeve itself is connected fixedly in terms of rotation, but axially displaceably, to the power take-off shaft, and the first shift sleeve and the second shift sleeve are jointly displaceable in the axial direction, but with axial play, so that, during the shift back into the off-road travel, first the first shift sleeve is synchronized with the first hollow shaft and then the second shift sleeve is synchronized with the second hollow shaft. Synchronization thus takes place in two stages, first for the lower torque for the acceleration of a central wheel and intermediate wheels and only then for the torque at the ring gear which is higher as a consequence of reduction. Thus, even in extreme driving situations, a reliable shift back into off-road travel during driving is ensured.

In the case of a synchronizing cut-in clutch, the third shift sleeve has first coupling parts which are connected fixedly in terms of rotation, but axially displaceably, to the second axle drive shaft. If, further, the third shift sleeve is displaceable in the axial direction with respect to the first coupling parts, the third shift sleeve can, unimpeded by the first coupling parts, lock the differential.

BRIEF DESCRIPTION OF THE DRAWINGS

The invention is described and explained below by means of illustrations of some embodiments of the subject of the invention in which:

FIG. 6 illustrates, enlarged, the detail 6 in FIG. 5, FIG. 7 illustrates, enlarged, the detail in FIG. 5.

DETAILED DESCRIPTION

Figure 1:
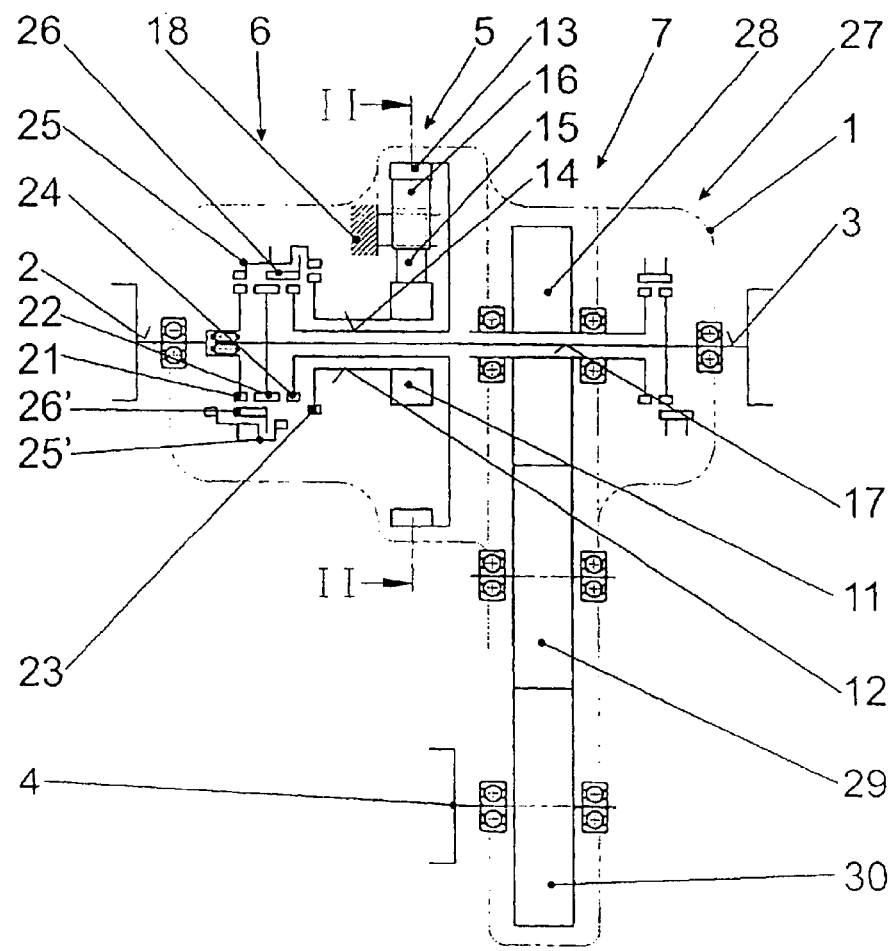
FIG. 1 illustrates a diagrammatic longitudinal section through a first simple embodiment.

In FIG. 1, the case of a power-split transmission is merely indicated and designated by 1. The power-split transmission is connected via an input shaft 2 to a motor/transmission unit, not illustrated, via a first output shaft 3, coaxial with the input shaft 2, to an axle, preferably the rear axle of an all-wheel driven motor vehicle, and via a second output shaft 4 to a second driven axle, preferably the front axle. The case 1 accommodates, as subassemblies of the power-split transmission, a reduction unit 5, a clutch unit 6 and an offset drive 7 for driving a second output shaft 4 offset with respect to the first output shaft 3.

Figure 2:
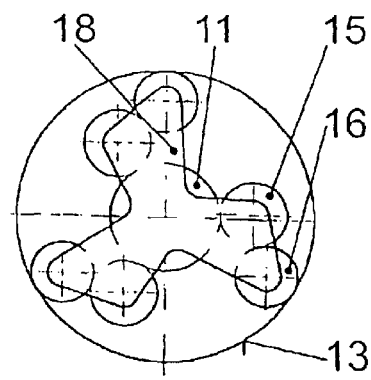
FIG. 2 illustrates a cross section according to 2—2 in FIG. 1.

FIG. 2 shows the engagement conditions in the reduction unit 5. The reduction unit 5 consists of a central driving gearwheel 11 on a first hollow shaft 12 (FIG. 1), of a central ring gear 13 on a second hollow shaft 14 and of at least two pairs of gearwheels 15, 16. 15 is in each case a first intermediate gearwheel and 16 a second intermediate gearwheel, in each case the first 15 meshing with the central driving gearwheel 11, the second 16 with the central ring gear 13 and both 15, 16 with one another. The first and second intermediate gearwheels 15, 16 rotate about spatially fixed axles which are part of an intermediate-gearwheel carrier 18 fixed to the case or are fixedly connected to said carrier.

As a consequence of the arrangement, the first hollow shaft 12 surrounds the second hollow shaft 14. Within the second hollow shaft 14 is provided a power take-off shaft 17. The two hollow shafts 12, 14 constitute the connection between the reduction unit 5 and the clutch unit 6, the power take-off shaft 17 passing through the reduction unit 5.

The clutch unit 6 consists of a first primary part 21 connected fixedly in terms of rotation to the input shaft 2, of the first secondary part 22 connected fixedly in terms of rotation to the power take-off shaft 17, of a second secondary part 23 connected fixedly in terms of rotation to the first hollow shaft 12 and of a second primary part 24 connected rotatably to the second hollow shaft 14. In the exemplary embodiment shown, these parts are designed in each case as clutch hubs. For changing over between road travel and off-road travel, they are connected, in each case in different ways, by means of a first shift sleeve 25 and a second shift sleeve 26.

The clutch unit 6 is illustrated in two different positions: in the "road travel" position below the axis of the power take-off shaft 17 and in the "off-road travel" position above it. In road travel, the second shift sleeve 26 (position 26') connects the first primary part 21 to the first secondary part 22 and therefore the input shaft 2 to the power take-off shaft 17. The shift sleeve 25 does not perform any function in this position, and the two hollow shafts 12, 14 are therefore free and may be stationary during driving in road travel. This means that the entire reduction unit 5 is stationary.

In off-road travel, the first shift sleeve 25 connects the first primary part 21 to the second secondary part 23 and therefore the input shaft 2 to the first hollow shaft 12 which constitutes the input of the reduction unit 5. The second shift sleeve 26 connects the second primary part 24 to the first secondary part 22 and therefore the second hollow shaft 14 to the power take-off shaft 17. The power take-off shaft 17 is drive-connected to the driving wheel 28 of the offset drive 7 via a cut-in clutch 27. The offset drive itself consists, here, of the driving wheel 28, of an intermediate wheel 29 and of a driven wheel 30, but could just as well be a traction drive.

Figure 3:
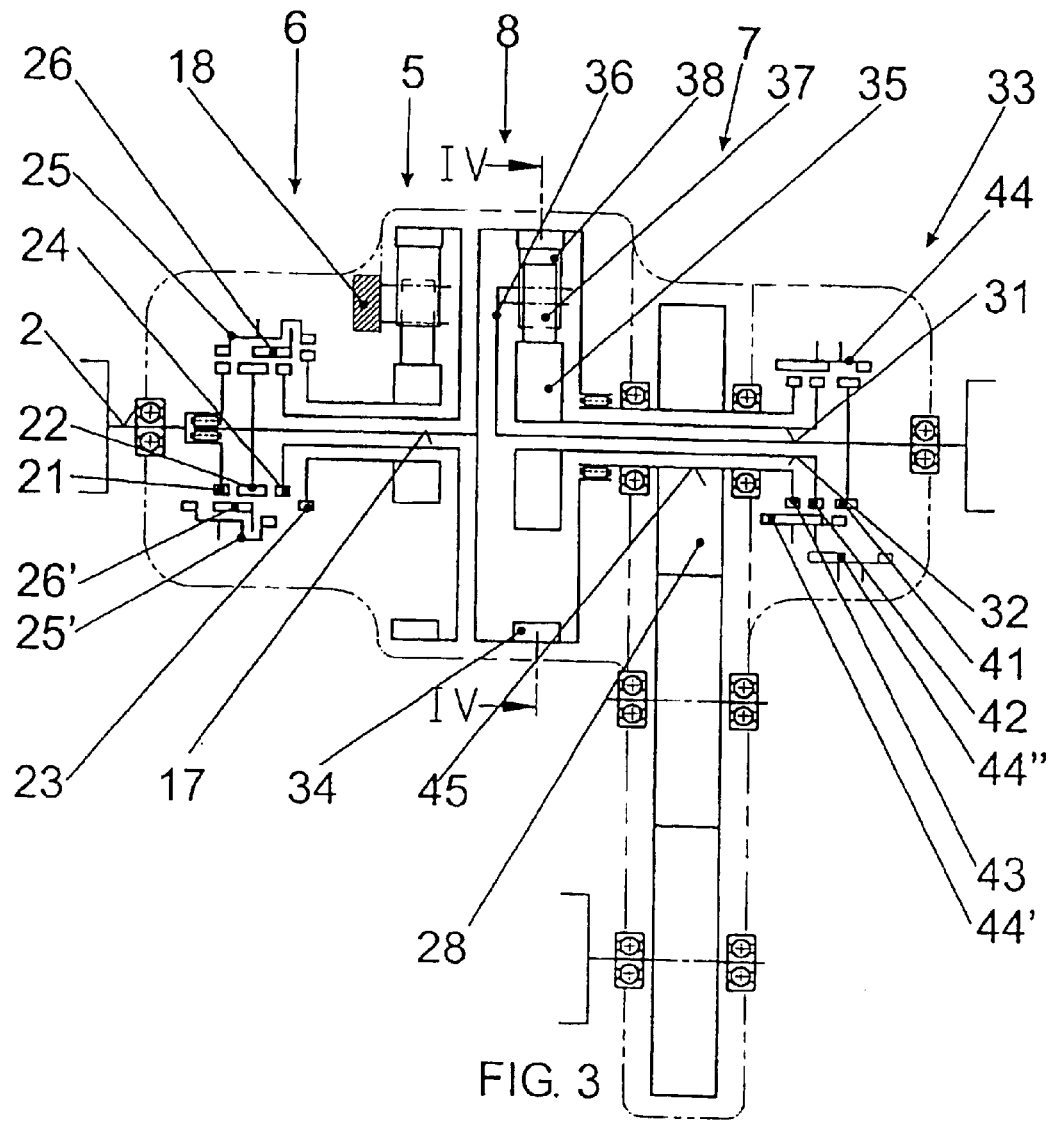
FIG. 3 illustrates a diagrammatic longitudinal section through a second embodiment.

FIG. 3 shows a power-split transmission in a form of construction in which it is extended by a central differential 8. Since it differs merely in the central differential and in a changed cut-in clutch, only these subassemblies are described here. The power take-off shaft 17 does not lead directly to the first output shaft 3 here, but to a central differential 8. Said power take-off shaft is connected fixedly in terms of rotation to the differential ring gear 34 of the central differential 8. Overall, the central differential 8 consists of the differential ring gear 34 connected fixedly in terms of rotation to the power take-off shaft 17, of a sun wheel 35 connected fixedly in terms of rotation to a second axle drive shaft 32 and of a planet carrier 36 connected fixedly in terms of rotation to the first axle drive shaft 31 and having first and second planet wheels 37, 38, in each case the first planet wheel 37 meshing with the sun wheel 35, the second planet wheel 38 with the differential ring gear 34 and the first and second planet wheels 37, 38 with one another.

Figure 4:
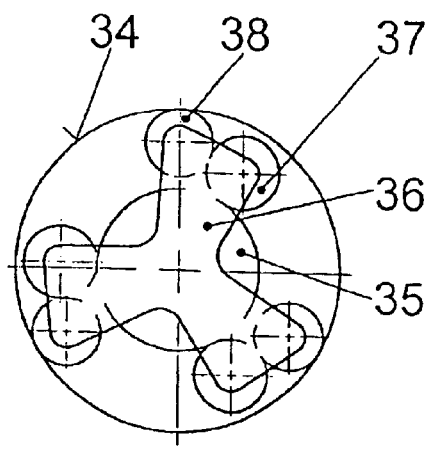
FIG. 4 illustrates a cross section according to 4—4 in FIG. 3.

FIG. 4 shows the engagement conditions in the central differential 8. The ring gear 13 of the reduction stage 5 and the differential ring gear 34 and/or the intermediate gearwheels 15, 16 and the planet wheels 37, 38 may be identical parts.

Further to FIG. 3: the output of the central differential 8 is formed by a first axle drive shaft 31 for driving the rear axle and by a second axle drive shaft 32. The driving wheel 28 of the offset drive 7 is seated, here, on a third hollow shaft 45. In the arrangement shown, first, the second axle drive shaft 32 designed as a hollow shaft is located inside this third hollow shaft 45 and the first axle drive shaft 31 is located within said second axle drive shaft. These three shafts can be connected in various ways again by means of a cut-in clutch 33.

The cut-in clutch 33 consists of first coupling parts 41 connected fixedly in terms of rotation to the first axle drive shaft 31, of second coupling parts 42 connected fixedly in terms of rotation to the second axle drive shaft 32, of third coupling parts 43 connected rotatably to the third hollow shaft 45 and of a third displaceable clutch sleeve 44. In the version illustrated, the coupling parts 41, 42, 43 are coupling hubs with coupling toothing.

The third clutch sleeve 44 can assume three positions: in the position 44 (upper half of the figure) for all-wheel drive with differential action, it connects the second coupling parts 42 to the third coupling parts 43 and therefore the sun wheel 35 to the third hollow shaft 45 and to the driving wheel 28, mounted thereof, of the offset drive 7. In the second position 44' (lower half of the figure) for all-wheel drive with locked differential, it connects the first coupling parts 41 to the second and third coupling parts 42, 43 and therefore the first axle drive shaft 31 to the third hollow shaft 45 and, moreover, two members (sun wheel 35 and planet carrier 36) of the central differential 8 to one another. In the third position 44" (drawn out, in a thin line), it connects the first coupling parts 41 to the second coupling parts 42 only, so that the third hollow shaft 45 is freely rotatable and the central differential 8 is locked.

Figure 5:
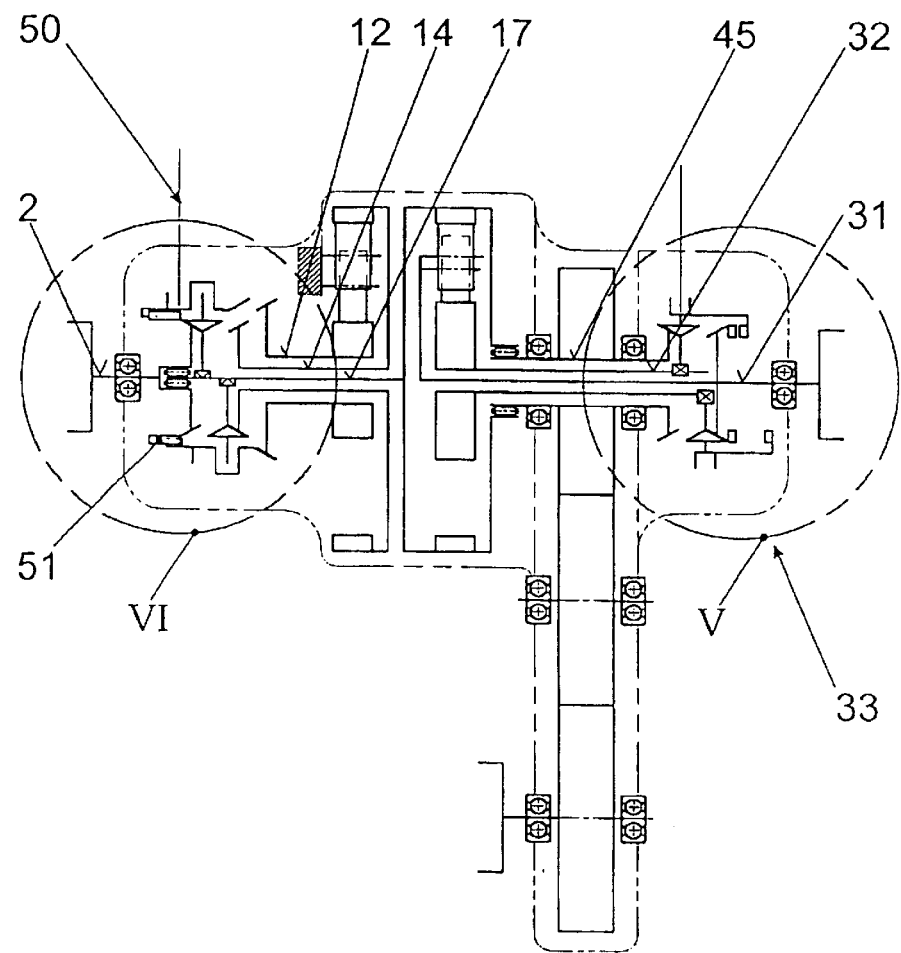
FIG. 5 illustrates a diagrammatic longitudinal section through a variant of the second embodiment with synchronization.

The embodiment of FIG. 5 differs from that of FIG. 3 only in that the clutch unit 50 for the reduction unit and the cut-in clutch 33 for the central differential are synchronized. The two clutches are shown, enlarged, in FIGS. 6 and 7. They may be flanged to the case 1 of the power-split transmission in separate case parts.

The synchronized clutch unit 50 shown in FIG. 6 consists of a first primary part 51 connected fixedly in terms of rotation to the input shaft 2, of a first secondary part 52 connected to the input shaft 2 fixedly in terms of rotation, but axially displaceably (splined shaft connection 58), of a second secondary part 53 connected fixedly in terms of rotation to the first hollow shaft 12 of the reduction unit 5, of a second primary part 54 connected fixedly in terms of rotation to the second hollow shaft 14, and of a first shift sleeve 55 and of a second shift sleeve 56. The first primary part 51 is again designed as a hub with a synchronizable contact surface and with one half of a sliding clutch 59. The contact surface may be a coupling toothing with associated synchronization, which is not dealt with in any more detail here because a multiplicity of suitable synchronizations are known. The first secondary part 52 possesses, here, two contact surfaces 52', 52", and its hub is axially displaceable on the power take-off shaft 17 by means of a splined shaft connection 58 and, moreover, is in one piece with the second shift sleeve 56. The second secondary part 53 and the second primary part 54 are also again designed to be synchronizable.

By the second shift sleeve 56 and consequently the first secondary part 52 being displaced, either the first contact surface 52' can be brought into engagement with the first primary part 51 or the second contact surface 52" can be brought into engagement with the second primary part 54. The first shift sleeve 55 carries the other clutch half of the sliding clutch 59, via which it is always connected fixedly in terms of rotation to the second input shaft 2. Said first shift sleeve possesses, at its other end, a further coupling surface 55' which can be brought synchronizably into engagement with the second secondary part 53. Further, the second shift sleeve 56 is guided freely rotatably and with axial play 57 in said first shift sleeve.

The upper half of the figure shows the position in road travel. The transmission of force takes place from the input shaft 2 via the first primary part 51 to the first contact surface 52' of the first secondary part 52 and from there to the power take-off shaft 17. For transition into off-road travel, the first shift sleeve 55 is displaced to the right, and, because of the sliding clutch 59, it always remains drive-connected to the input shaft 2. During displacement, first, the further contact surface 55' of the first shift sleeve 55 comes into contact with the second secondary part 53 and thus synchronizes the central output gearwheel 11 of the reduction unit 5 via the first hollow shaft 12. In the case of further displacement, during which the axial play 57 between the two shift sleeves 55, 56 is used up, the second contact surface 52" is also connected to the second primary part 54 and synchronizes the remaining parts. Synchronization is thereby subdivided into two phases.

The cut-in clutch 33 is constructed in a similar way in FIG. 7. It consists of first coupling parts 61 connected fixedly in terms of rotation to the first axle drive shaft, of second coupling parts 62 connected to the second axle drive shaft 32 fixedly in terms of rotation, but displaceably by means of a splined shaft connection 67, of third coupling parts 63 connected fixedly in terms of rotation to the third hollow shaft 45 and of a third clutch sleeve 64. The first coupling parts 61 are again arranged on a hub and additionally carry first coupling teeth 65. Their contact surface can be synchronized in whatever way. The second coupling parts 62 are connected fixedly in terms of rotation to the third clutch sleeve 64 via a sliding connection 68. The second coupling parts 62 can be brought into engagement selectively either by their first coupling surface 62' with the third coupling parts 63 or by their second coupling surface 62" with the first coupling parts 61.

Further, the third clutch sleeve 64 possesses two coupling teeth 66 for cooperation with the first coupling teeth 65 on the first coupling parts 61.

There are three positions: the first position (upper half of the figure) is all-wheel drive with differential action. The second axle drive shaft 32 is connected to the third hollow shaft 45. The second position (lower half of the figure) corresponds to the drive of only the rear axle via the first axle drive shaft 31. By means of the rotationally fixed connection of the two axle drive shafts 31, 32 via the first coupling parts 61 and the second coupling parts 62, the differential is thus locked. A neutral position is possible between these two positions. The third position is indicated by a thin line above the first half of the figure.

During the further displacement of the third clutch sleeve 64 out of the position for all-wheel drive in the upper half of the figure to the left, although the second coupling part 62 cannot move any further to the left, nevertheless, as a result of the rotationally fixed sliding connection 68, the third clutch sleeve 64 can be further displaced until the first and second coupling teeth 65, 66 are in engagement. Since the two axle drive shafts 31, 32 are thereby connected fixedly to one another, the differential is locked. The third clutch sleeve 64 possesses an annular groove 69, at which a shift fork, not illustrated, can act for shifting purposes.

What is claimed is:

1. A power-split transmission for motor vehicles with off-road travel, comprising of a case, of an input shaft, of a first output shaft coaxial with the latter, of a second output shaft offset with respect to said first output shaft, of a reduction unit, of a clutch unit and of an offset drive, wherein the reduction unit (5) comprises of:
    a) a central driving gearwheel (11) which is connected fixedly in terms of rotation to a first hollow shaft (12),
    b) a likewise central ring gear (13) which is connected fixedly in terms of rotation to a second hollow shaft (14),
    c) first and second intermediate gearwheels (15, 16) with an axle fixed to the case, in each case the first intermediate gearwheel (15) meshing with the central driving gearwheel (11), the second intermediate gearwheel (16) with the central ring gear (13) and the first and second intermediate gearwheels (15, 16) with one another,
    d) a power take-off shaft (17), and wherein the clutch unit (6; 50) comprises of:
    e) primary parts (21, 24; 51, 54) on the input shaft (2), and on the second hollow shaft (14) and secondary parts (22, 23; 52, 53) on the power take-off shaft (17) and on the first hollow shaft (12),
    f) a first shift sleeve (25; 55) for the rotationally fixed connection of the input shaft (2) to the first hollow shaft (12) in off-road travel, and
    g) a second shift sleeve (26; 56) for the rotationally fixed connection of the input shaft (2) to the power take-off shaft (17) in road travel and for connecting the second hollow shaft (14) to the power take-off shaft (17) in off-road travel.

2. The power-split transmission as claimed in claim 1, wherein the power take-off shaft (17) can be connected fixedly in terms of rotation to a driving wheel (28) of the offset drive (7) via a cut-in clutch (27).

3. The power-split transmission as claimed in claim 1, wherein the clutch unit (6) is arranged on that side of the reduction unit (5) which faces the input shaft (2) and the second hollow shaft (14) is arranged within the first hollow shaft (12).

4. The power-split transmission as claimed in claim 3, wherein the power take-off shaft (17) is drive-connected to a central differential (8) which is designed as a planetary transmission and which has two axle drive shafts (31, 32), in each case one or other of which can selectively be connected fixedly in terms of rotation to a driving wheel (28) of the offset drive (7) via a cut-in clutch (33).

5. The power-split transmission as claimed in claim 4, wherein the reduction unit (5) and the central differential (8) are arranged directly adjacently, being followed in the direction of the first output shaft (3) first by the offset drive (7) and then by the cut-in clutch (33).

6. The power-split transmission as claimed in claim 4, wherein the central differential (8) comprises of:
    a) a differential ring gear (34) connected fixedly in terms of rotation to the power take-off shaft (17),
    b) a sun wheel (35) connected fixedly in terms of rotation to a second axle drive shaft (32),
    c) a planet carrier (36) connected fixedly in terms of rotation to the first axle drive shaft (31) and having first and second planet wheels (37, 38), in each case the first planet wheels (37) meshing with the sun wheel (35), the second planet wheels (18) with the differential ring gear (34) and the first and second planet wheels (37, 38) with one another.

7. The power-split transmission as claimed in claim 6, wherein the ring gear (13) and the differential ring gear (34) and/or the intermediate gearwheels (15, 16) and the planet wheels (37, 38) are identical parts.

8. The power-split transmission as claimed in claim 6, wherein the cut-in clutch (33) comprises:
    a) first coupling parts (41; 61) connected fixedly in terms of rotation to the first axle drive shaft (31),
    b) second coupling parts (42; 62) connected fixedly in terms of rotation to the second axle drive shaft (32),
    c) third coupling parts (43; 63) connected fixedly in terms of rotation to the driving wheel (28) of the offset drive (7),
    d) a third clutch sleeve (44; 64) which, in two-wheel drive, connects the first (31) and the second (32) axle drive shafts to one another fixedly in terms of rotation, in four-wheel drive connects the second axle drive shaft (32) and the offset drive (37) to one another fixedly in terms of rotation and, in four-wheel drive with differential lock, connects the first axle drive shaft (31) and the offset drive (7) to one another fixedly in terms of rotation.

9. The power-split transmission as claimed in claim 8, with synchronizing clutch units, wherein the third shift sleeve (64) has first coupling parts (62) which are connected fixedly in terms of rotation, but axially displaceably, to the second axle drive shaft (32).

10. The power-split transmission as claimed in claim 9, wherein the first coupling parts (62) are displaceable in the axial direction with respect to the third shift sleeve (64).

11. The power-split transmission as claimed in claim 1, with synchronized clutch units, wherein the second shift sleeve (56) is connected fixedly in terms of rotation, but axially displaceably, to the power take-off shaft (17).

12. The power-split transmission as claimed in claim 11, wherein the first shift sleeve (55) and the second shift sleeve (56) are jointly displaceable in the axial direction, but with axial play, so that, during the shift back into off-road travel, first the first shift sleeve (55) is synchronized with the first hollow shaft (12) and then the second shift sleeve (56) is synchronized with the second hollow shaft (14).

* * * * *